Oct. 27, 1964 R. O. BALOGH 3,154,198
ROTATABLE DERRICKS FOR USE ON A TRUCK OR
OTHER SIMILAR MOBILE PLATFORM
Filed April 4, 1960 4 Sheets-Sheet 1
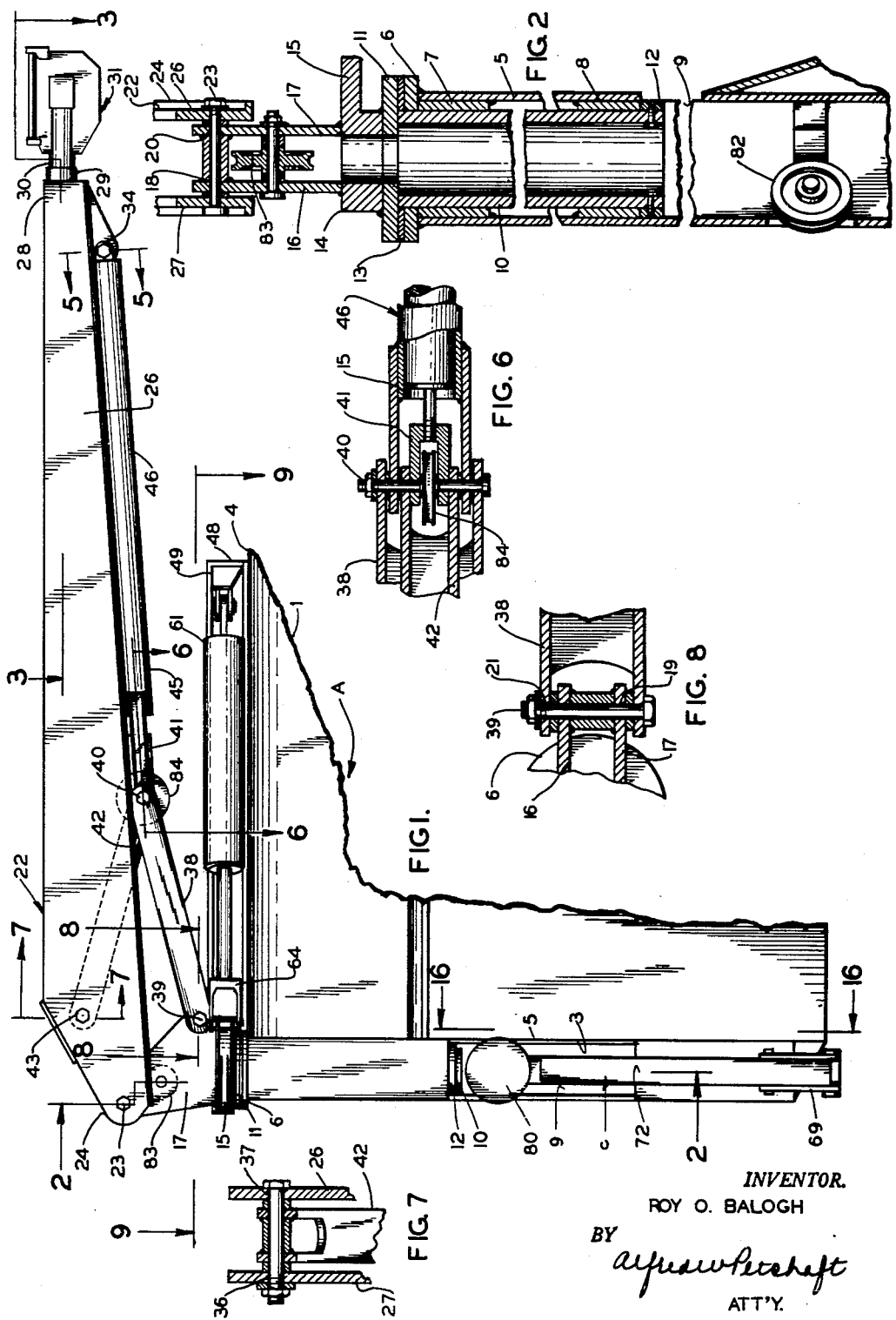
INVENTOR.
ROY O. BALOGH
BY
ATT'Y.

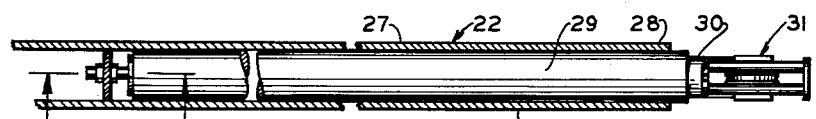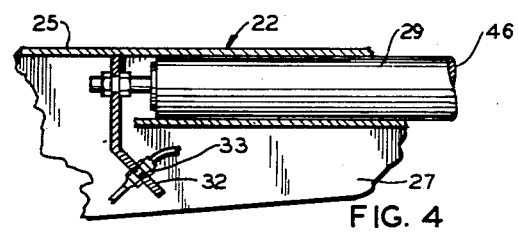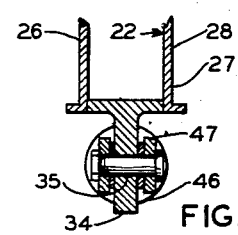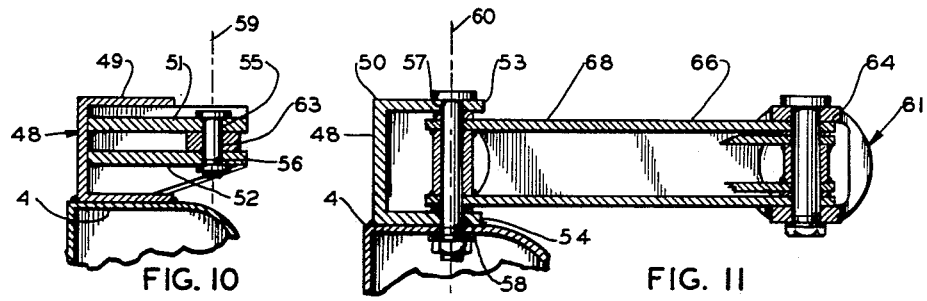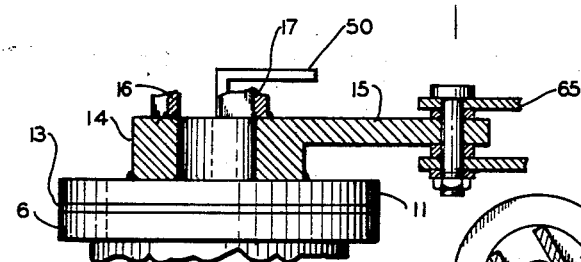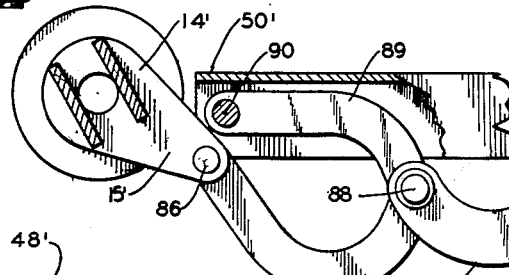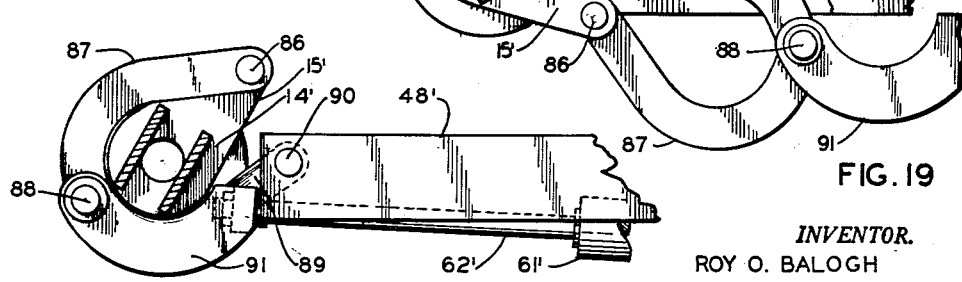

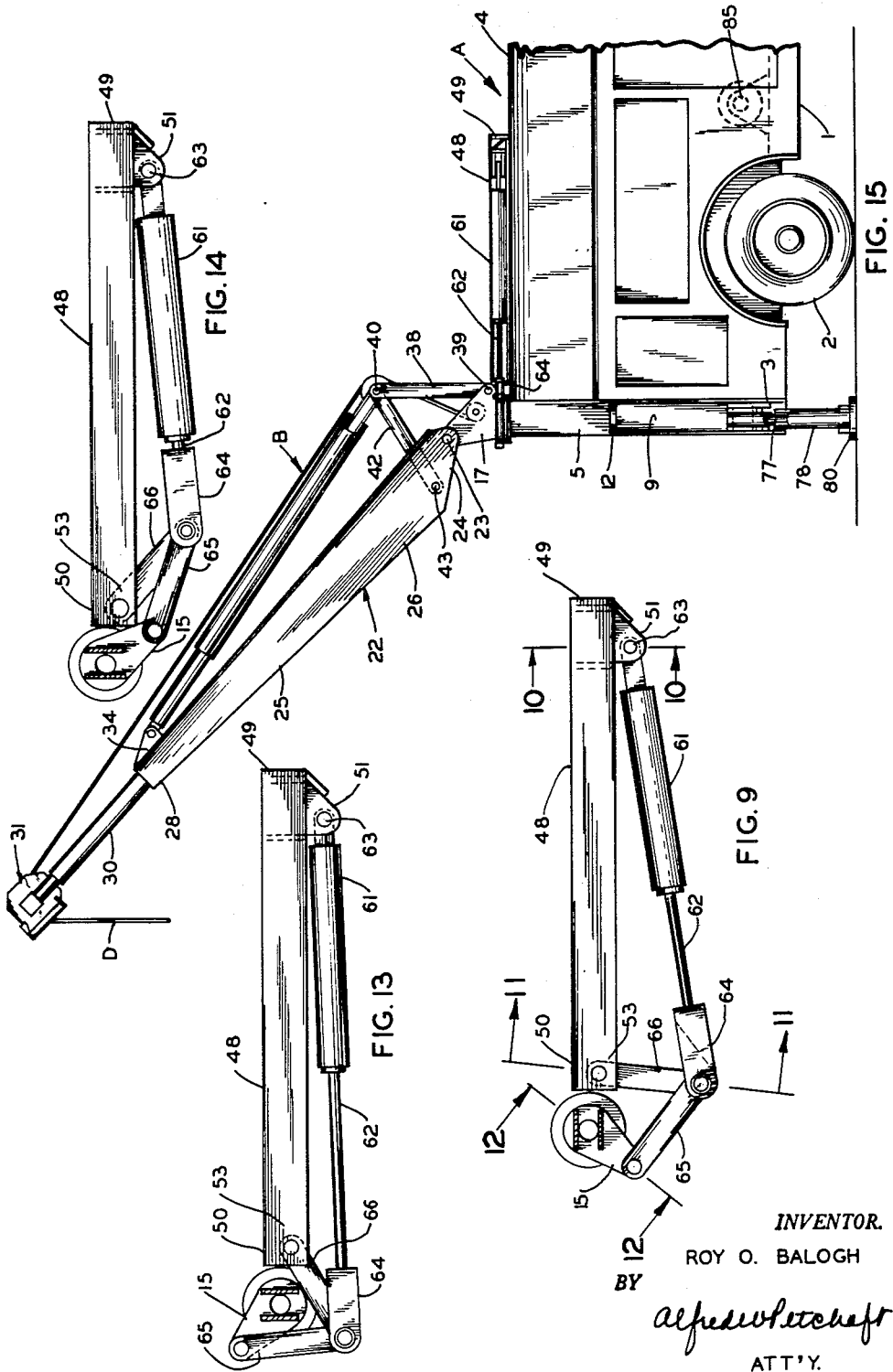

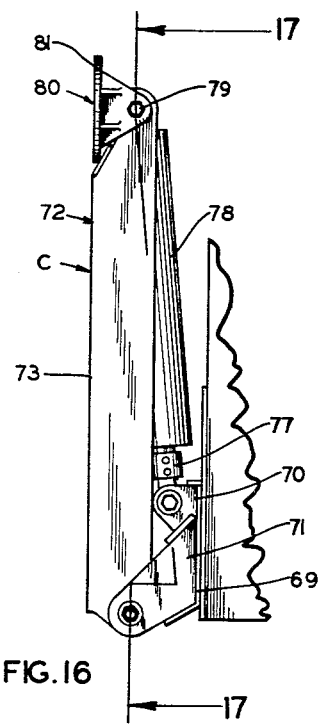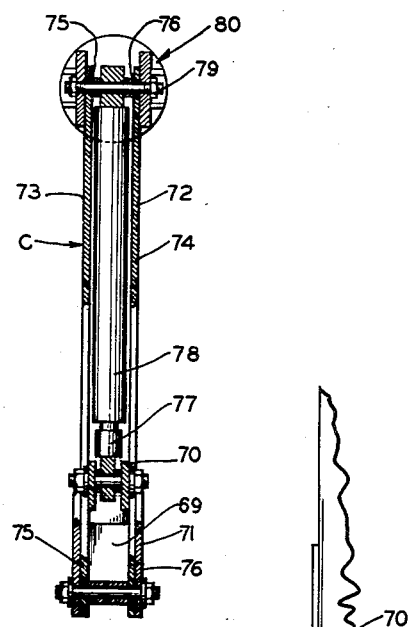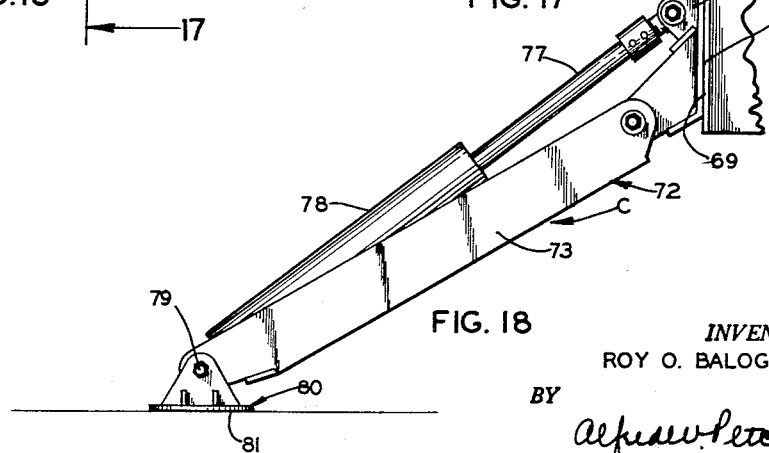

United States Patent Office 3,154,198
Patented Oct. 27, 1964

3,154,198
ROTATABLE DERRICKS FOR USE ON A TRUCK OR OTHER SIMILAR MOBILE PLATFORM
Roy O. Balogh, La Due, Mo., assignor to McCabe-Powers Body Company, St. Louis, Mo., a corporation of Missouri
Filed Apr. 4, 1960, Ser. No. 19,852
11 Claims. (Cl. 212—35)

This invention relates to certain new and useful improvements in rotatable derricks suitable for use on a truck or other similar mobile platform.

It is the primary object of the present invention to provide a derrick which may be mounted on a mobile platform, such as a truck or the like, and, when so mounted, is capable of both vertical and horizontal swinging movement.

It is another object of the present invention to provide a boom of the type stated wherein the boom may be attached to the upper rear portion of the truck or the like in such manner that ample head clearance is provided when the derrick is in use.

It is an additional object of the present invention to provide a boom derrick which is rotatable over a substantially greater range than 180° and which may be readily stowed in forwardly extending horizontal position along the upper portion of the truck body during transport.

With the above and other objects in view, my invention resides in the novel features of form, construction, arrangement, and combination of parts presently described and pointed out in the claims.

In the accompanying drawings (four sheets)—

FIG. 1 is a fragmentary side elevational view of a truck body equipped with a rotatable derrick constructed in accordance with and embodying the present invention;

FIGS. 2 and 3 are fragmentary sectional views taken along lines 2—2 and 3—3, respectively, of FIG. 1;

FIG. 4 is a fragmentary sectional view taken along line 4—4 of FIG. 3;

FIGS. 5, 6, 7, 8, and 9, are fragmentary sectional views taken along lines 5—5, 6—6, 7—7, 8—8, and 9—9, respectively, of FIG. 1;

FIGS. 10, 11, and 12, are fragmentary sectional views taken along lines 10—10, 11—11, and 12—12, respectively, of FIG. 9.

FIGS. 13 and 14 are fragmentary sectional views similar to FIG. 9 showing the parts in different positions;

FIG. 15 is a fragmentary side elevational view of a truck body showing a stabilizing outrigger forming a part of the present invention;

FIG. 16 is a fragmentary side elevational view of the stabilizing outrigger in the retracted or transport position;

FIG. 17 is a fragmentary sectional view taken along line 17—17 of FIG. 16;

FIG. 18 is a fragmentary sectional view of the outrigger in extended or operative position; and FIGS. 19 and 20 are fragmentary sectional views of a modified form of side-swinging linkage shown in two extreme positions respectively.

Referring now in more detail and by reference characters to the drawings, which illustrate practical embodiments of the present invention, A designates a truck including a body 1 supported from the ground by wheels 2 and having a vertical rear wall 3 and a horizontal top wall 4 conventionally constructed and reinforced so as to have suitable strength. Rigidly secured to the rear wall 3 and extending vertically therealong is a cylindrical pedestal 5 for operatively supporting a derrick B. The pedestal 5 is provided at its upper end with an annular flange 6 and internally with two axially spaced upper and lower bearing sleeves 7 and 8. As will be seen by reference to FIG. 2, the pedestal 5 is tubular and is provided intermediate its upper and lower ends with an access opening 9 spaced slightly below the lower bearing sleeve 7.

Rotatably mounted within the bearing sleeves 7, 8, is an inner mast 10 provided at its upper end with an annular flange 11 which is complementary to and bears operatively upon the annular flange 6. The inner mast is held in place by a retaining ring 12 which is attached below the bearing sleeve 8 to the lower end of the inner mast 10 through the access opening 9. Preferably, though not necessarily, a thrust washer 13 is disposed about the periphery of the inner mast 10 between the annular flanges 6 and 11. Rigidly secured to the top of the inner mast 10 is a derrick base 14 having an outwardly extending arm 15 and a pair of spaced upwardly projecting plates 16, 17, which are respectively provided with spaced upper and lower apertures 18, 19, 20, 21, the apertures 18, 20, and the apertures 19, 21, each being respectively in horizontal alignment for reasons presently to be pointed out.

A U-shaped boom 22 is pivotally connected to the derrick base 14 by means of a pintle 23 inserted through the lower end 24 of the boom 22 and the aligned apertures 18, 20, in the derrick base 14, the boom 22 being so attached that the bight 25 of the U-shaped channel is upwardly presented when the boom is in the transport position shown in FIG. 1. Rigidly connected to, and extending outwardly from, the swinging end 28 of the boom 22 is a double-acting hydraulic cylinder 29 having an extensible arm 30 which is provided at its outer end with a conventional sheave-block 31. The cylinder 29 is conventionally adapted to receive hydraulic fluid under pressure from a source of hydraulic fluid under pressure and will extend or retract under load upon suitable application of the hydraulic fluid. The cylinder 29 is provided with conventional hydraulic tubing and preferably, though not necessarily, the boom 22 is integrally provided with a coupling plate 32 to which the hydraulic connection of the cylinder 29 is rigidly secured and to which is also secured a conventional fitting 33 for coupling the cylinder 29 to the hydraulic fluid source. Rigidly secured to the swinging end 28 of the boom 22 between the parallel sides 26, 27, and extending outwardly therefrom, is a pivoting ear 34 provided with an aperture 35. It should be noted that the pivoting ear 34 extends completely between the parallel sides 26, 27, to each of which it is welded, for purposes of providing substantial structural support for the swinging end 28 of the boom 22. At its lower end, the boom is also provided with a pair of aligned apertures 36, 37.

A first link 38 is pivotally connected at one end to a pin 39 mounted in and extending horizontally between the apertures 19, 21. At its other end, the link 38 is pivotally connected by means of a pin 40 to a clevis 41. In like manner, a second link 42 is pivotally connected to the boom 22 by a pin 43 mounted in and extending between the aligned apertures 36, 37. At its other end, the link 42 is pivotally connected by a pin 40 to the clevis 41. The clevis 41 is also rigidly mounted to the lower end 45 of a main hydraulic cylinder 46 of the double-acting type and having an extensible piston rod 47 which is attached pivotally to the pivoting ear 34 through the aperture 35. Like the cylinder 29, the main cylinder 46 is conventional in structural details and the internal structure thereof is, therefore, not specifically shown or described herein. It suffices for present purposes to point out that the main cylinder 46 is operatively connected by conventional means to a source of hydraulic fluid under pressure through a conventional valve (not shown) for effecting movement of the extensible piston arm 47 in either outward or inward direction as may be desired.

Rigidly secured to the top wall 4 in proximity to the pedestal 5 is an elongated bracket 48 provided respectively at its forward and rearward ends 49, 50, with pairs of spaced ears 51, 52, and 53, 54, each of which are rigidly secured to the bracket 48 and each of which are respectively provided with aligned apertures 55, 56, 57, 58. The apertures 55, 56, in the spaced ears 51, 52, at the forward end 49 of the bracket 48 define a forward vertical axis 59 and, in like manner, the apertures 57, 58, in the spaced ears 53, 54, at the rearward end 50 of the bracket 48, define a rear vertical axis 60. A hydraulic rotational driving cylinder 61, having an extensible piston rod 62, is pivotally connected to the spaced ears 51, 52, for pivotal movement about the forward vertical axis 59 by means of a conventional pin 63 inserted through the apertures 55, 56. A clevis 64 is rigidly secured to the outer end of the extensible piston rod 62 and third and fourth links 65, 66, are pivotally connected in common to the clevis 64. The other end of the third link 65 is pivotally connected to the outwardly extending arm 15 of the derrick base 14, and the other end 68 of the fourth link 66 is pivotally connected to the spaced ears 53, 54, in the rearward end 50 of the bracket 48 for pivotal movement about the rearward vertical axis 60. The cylinder 61 is of the double-acting type and suitably connected to a source of hydraulic fluid under pressure through a conventional valve (not shown).

To insure stability of the truck A during loaded rotation of the boom 22, outriggers C are provided. Each outrigger C comprises a base plate 69 on which is mounted a pair of spaced clevises 70, 71. Pivotally mounted on the lower clevis 71, and extending outwardly therefrom, is a U-shaped link member 72 having a pair of spaced parallel sides 73, 74, the sides 73, 74, being provided at their swinging ends with a pair of spaced aligned apertures 75, 76. A piston rod 77 is pivotally mounted in the upper clevis 70 of the base plate 69 and extends upwardly therefrom into a double-acting hydraulic cylinder 78 which, like the other hydraulic cylinders, is conventional and is also adapted to shift the piston rod 77 in either direction. The cylinder 78 is connected to a source of hydraulic fluid under pressure by conventional means and, as is the case with the other hydraulic cylinders, the fluid source is associated with conventional valve means for optionally shifting the piston 77 in a selected direction within the cylinder 78. The outer end of the cylinder 78 is pivotally mounted on a pivot pin 79 which extends between the spaced parallel sides 73, 74, through the apertures 75, 76. Also pivotally mounted on the pivot pin 79 in common with the link members 72, and the cylinder 78, is an outrigger base 80 having a flat surface 81 adapted to contact the ground when the outrigger C is extended and being over-weighted at its lower portion (reference being made to FIG. 16) so as to be biased flushwise against the member 72 when the piston arm is completely retracted within the cylinder 78 and the outrigger C is thus in the transport position.

The boom 22 is also provided with spaced sheaves 82, 83, and 84, the sheave 82 being operatively mounted within the hollow portion of the pedestal 5, the sheave 83 being operatively mounted between the spaced plates 16, 17, on the derrick base 14, and the sheave 84 being operatively mounted on the clevis 41. It will be noted that the sheaves 82, 83, are tangent to the vertical centerline of the inner mast 10 and the sheaves 83, 84, are coplanar. It has been found with this construction and combination of sheaves, that when a conventional winch 85 is operatively mounted on the truck A and a conventional cable D is routed from the winch across the sheaves 82, 83, and 84, and around the sheave block 31, the cable D will be operative regardless of the position of inclination or rotation of the boom 22.

In use, the boom 22 is transported with the cylinder 29 in the fully retracted position, as shown in FIG. 1. In this "transport" position, the main cylinder 46 is fully retracted, the outrigger cylinder 78 is fully retracted, and the rotational driving cylinder 61 is in the half-extended position shown in FIG. 9. In this position, the boom 22 is in substantial alignment with the longitudinal axis of the truck A and is in substantially horizontal overlying relation to the top wall 4. When desired, the truck A can be parked in a work location and the outriggers C placed in contact with the ground for purposes of lateral support by applying hydraulic fluid to the cylinders 78 in such manner that the piston rods 77 are caused to shift outwardly, whereby the cylinders 78 and the link members 72 simultaneously pivot about the outrigger base plates 69 and the outrigger bases 80 are brought into contact with the ground. Thereupon, hydraulic pressure is applied to the main cylinder 46 in such manner that the extendible piston rod 47 is caused to move outwardly therefrom, which results in a simultaneous pivoting of the piston rod 47 about the pivoting ear 34 and this motion is transmitted to the links 38, 42, swinging the boom 22 about the derrick base 14, whereupon the sheave block 31 moves along an arcuate path with respect to the derrick base 14 rearwardly above and over the truck A. The effective length of the derrick boom may be selectively altered by application of hydraulic fluid to the cylinder 29 and the azimuthal position of the boom 22 may be varied by proper application of hydraulic fluid to the rotation driving cylinder 61 which, through the arm 15, and the third and fourth links 65, 66, determine a finite arcuate range of operation of the boom 22 within a total arc of about 185°, i.e. from the position shown in FIG. 13 to the position shown in FIG. 14. For a proper selection of the length of the main derrick cylinder 46, it has been found possible to bring the boom 22 completely rearwardly with respect to the truck A and in contact with the ground whereupon a quite heavy load may be readily attached to the boom 22 through the sheave block 31 and moved selectively by a single operator who controls the conventional hydraulic directing valves which operate the cylinders.

To restore the boom 22 to the transport position after completion of the work, the following acts are accomplished in the stated sequence. First, the piston 30 is completely retracted within the cylinder 29. Then, the rotational driving cylinder 61 is operated until the extending piston rod 62 is approximately half way within the cylinder 61, thus bringing the boom 22 into rotational alignment for placing it in the transport position. Thereafter, the main cylinder 46 is operated until the extensible piston rod 47 is completely within the cylinder 46, whereupon the boom 22 is in transport position over the truck A. Finally, the outrigger cylinders 78 are operated and the piston arms 77 are completely withdrawn, placing the outriggers C in the transport position against opposite sides of the truck A.

It is also possible to provide a modified form of horizontal rotation linkage, as shown in FIGS. 19 and 20, comprising a derrick base 14' having a radial arm 15', an elongated horizontal bracket 48', and an hydraulic rotating cylinder 61' having a piston rod 62', all substantially identical with the base 14, arm 15, bracket 48, cylinder 61, and piston rod 62, as previously described. Pivotally secured to the outer end of the arm 15' by means of a pin 86 is a curved link 87 which is, in turn, pivotally connected by a pin 88 to a complementarily curved link 89 and the latter is pivotally secured by a pin 90 to the bracket 48'. The pin 88 is also pivotally connected to a curved connector link 91, which is, in turn, connected to the outer end of the piston rod 62'. When the piston rod 62' is fully withdrawn within the piston 61', the links 87, 89, and 91, will assume the positions shown in FIG. 19. When the piston rod 62' is fully extended, the links 87, 89, and 91, will assume the positions shown in FIG. 20, in which latter positions the links encircle the base 14' and the arm 15' will thus be rotated through approximately 270°.

It should be understood that changes and modifications in the form, construction, arrangement, and combination of the several parts of the rotatable derricks for use on a truck or other similar mobile platform may be made and substituted for those herein shown and described without departing from the nature and principle of my invention.

Having thus described my invention, what I claim and desire to secure by Letters Patent is:

1. A rotatable derrick boom comprising a pedestal, a mast rotatably mounted on said pedestal, a derrick base secured to said mast, a boom pivotally mounted at one end of said derrick base and having an ear at the other end, a first link pivotally attached at one end to the derrick base and pivotally attached at the other end to one end of a second link, said second link also being pivotally attached at its other end to said boom, a main derrick cylinder including a chamber and a piston slidably mounted in said chamber, the cylinder being connected to the common attachment of the first and second links, the piston being connected at its outer end to the ear, said main derrick cylinder being operatively connected to a hydraulic power source in such manner that hydraulic power may be applied selectively to cause extension and retraction of the piston with respect to the cylinder, a third link pivotally connected at one end to said mast, a fourth link pivotally connected to the other end of the third link at one end and to a first fixed pivot at the other end for pivotal movement about a fixed axis, and a power-driven extensor including a stationary member and a recovering member which moves with respect to the stationary member, said extensor being adapted for power-driven movement of the moving member both towards and from the stationary member, said extensor being pivotally connected at one end to the common connection of the third and fourth links and pivotally connected at the other end to a second fixed pivot, the connection of said extension and second fixed pivot being located on opposite sides of the common connection of said fourth link and first fixed pivot with respect to the common connection of said mast and third link, whereby extension of said extensor will rotate said mast in one direction and locate the common connection of said third and fourth links on one side of the connection of said fourth link and first fixed pivot and retraction will locate the common connection of said third and fourth links on the opposite side of said connection of said fourth link and first fixed pivot with respect to said connection of said mast and third link.

2. The pivoting means of claim 1 in which the pedestal is mounted upon a mobile vehicle and wherein a bracket is attached to the mobile vehicle and defines a pair of spaced vertical axes, the third link is pivotally connected at one end to a radial extension of the mast and at the other end to one end of the fourth link, the fourth link is connected at its other end to the bracket for pivotal movement about one vertical axis, the extensor comprises a hydraulically powered cylinder including a stationary member and a piston member movable therein, the piston member being connected at the end closer to the mast to the common connection of the third and fourth links and the stationary member being connected at its end further away from the mast to the bracket for pivotal movement about the other vertical axis.

3. The boom of claim 1 wherein the third link and the fourth link are each provided with an arcuate bend of substantial radius whereby when the power-driven extensor is extended fully the arcuate links will extend around the mast from the first fixed member, said arcuate bends being so sized and shaped as to form a smooth continuous curve from the first member to the mast when the extensor is fully extended.

4. A rotatable derrick for use with a mobile platform comprising a pedestal secured to the platform, a mast rotatably mounted on said pedestal, a derrick base secured to said mast, a boom pivotally mounted at one end on said derrick base and having an ear at the other end, a double-acting hydraulic cylinder mounted within said boom, an extensible arm mounted within said cylinder and extending forwardly of said boom, a sheave block mounted on the forwardly extending end of said extensible arm, a first link pivotally attached at one end to the derrick base and at the other end to a second link, said second link also being pivotally attached to said boom, means operatively connected to the ear and to the common attachment of the first and second links for alternately increasing and decreasing the spacing therebetween whereby to cause the boom to pivot with respect to the derrick base, a first sheave rotatably mounted adjacent the pivotal connection of said first and second links, a second sheave rotatably mounted at the point of pivotal connection of said mast and pedestal, a third sheave rotatably mounted on said mast in downwardly spaced vertical relation to said second sheave, a cable trained over said sheave block and said first, second, and third sheaves so that said cable will be operative regardless of the position, inclination or rotation of said boom.

5. A rotatable derrick for use with a mobile platform comprising a pedestal secured to the platform, a mast rotatably mounted on said pedestal, a derrick base secured to said mast, a boom pivotally mounted at one end on said derrick base and having an ear at the other end, a double-acting hydraulic cylinder mounted within said boom, an extensible arm mounted within said cylinder and extending forwardly of said boom, a sheave block mounted on the forwardly extending end of said extensible arm, a first link pivotally attached at one end to the derrick base and at the other end to a second link, said second link also being pivotally attached to said boom, means operatively connected to the ear and to the common attachment of the first and second links for alternately increasing and decreasing the spacing therebetween whereby to cause the boom to pivot with respect to the derrick base, a first sheave rotatably mounted adjacent the pivotal connection of said first and second links, a second sheave rotatably mounted at the point of pivotal connection of said mast and pedestal, a third sheave rotatably mounted on said mast in downwardly spaced vertical relation to said second sheave, said second and third sheaves being tangent to the vertical center line of said mast and being in coplanar relationship to each other, a cable trained over said sheave block and said first, second, and third sheaves so that said cable will be operative regardless of the position, inclination or rotation of said boom.

6. A rotatable derrick boom comprising a pedestal, a mast rotatably mounted on said pedestal, a derrick base secured to said mast, a boom pivotally mounted at one end of said derrick base and having an ear at the other end, a double-acting hydraulic cylinder mounted within said boom, an extensible arm mounted within said cylinder and extending forwardly of said boom, a sheave block mounted on the forwardly extending end of said extensible arm, a first link pivotally attached at one end to the derrick base and at the other end to a second link, said second link also being pivotally attached to said boom, a main derrick cylinder including a chamber and a piston slidably mounted in said chamber, the cylinder being connected to the common attachment of the first and second links, the piston being connected at its outer end to the ear, said main derrick cylinder being operatively connected to a hydraulic power source in such manner that hydraulic power may be applied selectively to cause extension and retraction of the piston with respect to the cylinder, a first sheave rotatably mounted adjacent the pivotal connection of said first and second links, a second sheave rotatably mounted at the point of pivotal connection of said mast and pedestal, a third sheave rotatably mounted on said mast in downwardly spaced vertical relation to said second sheave, a cable trained over said sheave block, and said first, second, and third sheaves so that said cable will be operative regardless of the position, inclination, or rotation of said boom, a third link pivotally connected at one end to said mast, a fourth link pivotally connected to the other end of the third link at one end and to a first fixed member at the other end for pivotal movement about a fixed axis, and a power-driven extensor including a stationary member and a recovering member which moves with respect to the stationary member, said extensor being adapted for power-driven movement of the moving member both towards and from the stationary member, said extensor being pivotally connected at one end to the common connection of the third and fourth links and pivotally connected at the other end to a second fixed member, the connection of said extensor and second fixed member being located on opposite sides of the common connection of said fourth link and first fixed member with respect to the common connection of said mast and third link, whereby extension of said extensor will rotate said mast in one direction and locate the common connection of said third and fourth links on one side of the connection of said fourth link and first fixed member, and retraction will locate the common connection of said third and fourth links on the opposite side of said connection of said fourth link and first fixed member with respect to said connection of said mast and third link.

7. A portable collapsible type derrick comprising a base mounted on a support for rotary movement in a generally horizontal plane, means for rotating said base, a boom pivotally mounted at one end on said base for swinging movement in a generally vertical plane from a forward storage position to rearward load supporting position, said boom comprising an inner section and an outer extendible section adapted for lengthwise telescoping relation with said inner section for varying the effective length of said boom, means including a reciprocal motor unit for telescoping said outer boom section with respect to said inner boom section, and means for moving said boom from said storage position to load supporting position and vice-versa, said last mentioned means comprising powered reciprocal means pivotally connected at one end thereof to the boom outwardly therealong from the pivotal connection of said boom to said base, link means pivotally connected to said base downwardly from the pivotal connection of said boom to said base, said link means being disposed generally in laterally spaced relation to said pivotal connection of said boom to said base and being adapted for pivotal movement in a generally vertical plane and with respect to said base, the other end of said reciprocal means being pivotally connected to said link means outwardly therealong from the pivotal connection of said link means to said base, and second link means extending between said first link means and said boom and being pivotally connected thereto, said second link means operating to pivot said first link means relatively to the pivotal connection of the said boom to said base upon actuation of said powered reciprocal means to move said boom from storage position to load supporting position.

8. In a portable derrick in accordance with claim 7 wherein said base is mounted for rotation on a pedestal-like support and said base comprises an arm projecting in a generally horizontal direction outwardly from said base, said arm being disposed generally rearwardly of said base in said storage position of said boom, said means for rotating said base comprising a powered reciprocal motor unit and articulated linkage mechanism, said articulated linkage mechanism comprising a first driver link pivotally mounted at one end to the support forwardly of and adjacent to said base, said driver link projecting generally laterally outwardly of said base when the latter is oriented to dispose said boom in said storage position, a follower link pivotally connected at one end thereof to said driver link and pivotally connected at the other end thereof to said arm, said last mentioned motor unit being pivotally connected to the support forwardly of said base and at the other end thereof being pivotally connected to said driver link adjacent the pivotal connection of said driver link to said follower link, said links being of inwardly bent configuration in plan view whereby the latter may extend around said pedestal-like base support upon actuation of said last mentioned motor unit to thereby permit rotation of said base 180° in a horizontal plane.

9. In combination a vehicle, a collapsible type derrick located on a rear corner of the vehicle and comprising a base mounted on a pedestal-like support on said corner of the vehicle for rotary movement in a generally horizontal plane, said base comprising an arm projecting generally horizontally outwardly from said base, a boom pivotally mounted at one end on said base for swinging movement in a generally vertical plane and from a generally horizontally disposed storage position overlying the vehicle in parallel relation to the longitudinal vertical center plane of the vehicle, to rearward load supporting position and vice-versa, said arm extending diagonally rearwardly in outward projecting relation to the vertical plane of the corresponding side of the vehicle in said storage position of said boom, means for rotating said base in said horizontal plane through an arc of movement of 180°, said means comprising a horizontally disposed reciprocal motor unit and an articulated linkage mechanism, said motor unit being pivotally connected at one end thereof to said vehicle and at the other end thereof to said articulated linkage mechanism, said articulated mechanism and said motor unit being so arranged that said boom may be disposed so as to extend laterally of said side of the vehicle and may be disposed transversely of said vehicle with the free end of said boom being positioned forwardly of the rear end of the vehicle when said boom is in load supporting position and upon predetermined selective actuation of said motor unit, said boom comprising an inner section pivotally attached to said base and an outer extendible section adapted for lengthwise telescoping relation with said inner section for varying the effective length of said boom, a reciprocal motor unit coacting between said boom sections for telescoping said outer boom section with respect to said inner boom section, and means for moving said boom from said storage position to load supporting position and vice-versa, said last mentioned means comprising a powered reciprocal piston and cylinder unit pivotally connected at one end thereof to said inner boom section and disposed below said boom when the latter is in said storage position, link means pivotally connected to said base downwardly from the pivotal connection of said boom to said base, said link means being disposed in laterally spaced relation to said pivotal connection of said boom to said base and being adapted for pivotal movement in a generally vertical plane coplanar with the vertical plane of movement of said boom, the other end of said piston and cylinder unit being pivotally connected to said link means adjacent the free end of said link means, and second link means extending between said first link means and said inner boom section and being pivotally connected thereto, said second link means operating to pivot said first link means relatively to the pivotal connection of said boom to said base upon actuation of said piston and cylinder unit to move said boom from storage position to load supporting position, to thereby pivot said piston and cylinder unit outwardly about its pivotal connection to said inner boom section and away from the pivotal connection of said boom to said base.

10. A rotatable derrick comprising a vertical pedestal, a mast rotatably mounted on the pedestal and including a derrick base, a boom pivotally mounted on said base for swinging movement about a horizontal axis, means for pivoting said boom on said base around a substantially horizontal axis, said last-named means including first and second articulated elements, said articulated elements being pivotally connected to each other by a common connection at one end, said articulated elements further being pivotally connected at their other ends respectively to the derrick base and the boom, a lengthwise extensible hydraulic motor pivotally connected at one end to the boom and at the other end to the common connection between said articulated elements, one link pivotally connected to said mast, a companion link pivotally connected to said one link at one end and at the other end to a first fixed pivot, and extensible means pivotally connected at one end to the common connections of said one link and companion link and at the other end to a second fixed pivot, said connection of extensible means and second fixed pivot being located on opposite sides of the common connection of said companion link and said first fixed pivot with respect to the common connection of said mast and said one link, said extensible means being adapted for powered extension and retraction whereby to rotate said mast within said pedestal, whereby extension of said extensible means will rotate said mast in one direction and locate the common connection of said one link and the companion link on one side of said connection of said first fixed pivot and companion link and retraction will rotate said mast in the opposite direction and locate the common connection of said one link and companion link on the opposite side of said connection of said first fixed pivot and companion link.

11. A rotatable derrick comprising a vertical pedestal, a mast rotatably mounted on the pedestal and including a derrick base, a boom pivotally mounted on said base, means for pivoting said boom on said base around a substantially horizontal axis, said last-named means including first and second articulated elements, said articulated elements being pivotally connected to each other by a common connection at one end, said articulated elements further being pivotally connected at their other ends respectively to the derrick base and the boom, a lengthwise extensible hydraulic motor pivotally connected at one end to the boom and at the other end to the common connection between said articulated elements, one link pivotally connected at one end to said mast, a companion link pivotally connected to the other end of said one link at its one end and at its other end to a first fixed pivot, and extensible means pivotally connected at one end to the common connections of said one link and companion link and at the other end to a second fixed pivot, said connection of extensible means and second fixed pivot being located on opposite sides of the common connection of said companion link and said first fixed pivot with respect to the common connection of said mast and said one link, said extensible means being adapted for powered extension and retraction whereby to rotate said mast within said pedestal, whereby extension of said extensible means will rotate said mast in one direction and locate the common connection of said one link and the companion link on one side of said connection of said first fixed pivot and companion link and retraction will rotate said mast in the opposite direction and locate the common connection of said one link and companion link on the opposite side of said connection of said first fixed pivot and said companion link.

References Cited in the file of this patent
UNITED STATES PATENTS

| | | |
|---|---|---|
| 2,672,990 | Sundin | Mar. 23, 1954 |
| 2,718,312 | Pilch | Sept. 20, 1955 |
| 2,740,538 | Felkner | Apr. 3, 1956 |
| 2,786,580 | Balogh | Mar. 26, 1957 |
| 2,786,581 | Balogh | Mar. 26, 1957 |
| 2,786,582 | Foster | Mar. 26, 1957 |
| 2,815,250 | Thornton | Dec. 3, 1957 |
| 2,831,589 | Way | Apr. 22, 1958 |
| 2,855,111 | McIntyre | Oct. 7, 1958 |
| 2,980,263 | Troche | Apr. 18, 1961 |
| 3,096,886 | Hall | July 9, 1963 |

FOREIGN PATENTS

| | | |
|---|---|---|
| 956,881 | Germany | Jan. 24, 1957 |
| 1,065,150 | Germany | Sept. 10, 1959 |